No. 615,431. Patented Dec. 6, 1898.
H. C. CORNELIUS.
STOPPER FOR FIXED WASHBOWLS.
(Application filed Dec. 13, 1897.)

(No Model.)

Witnesses
Frank W. Murphy.
Frank H. Deane

Inventor
H.C. Cornelius
By W.E. Williams
atty

UNITED STATES PATENT OFFICE.

HAROLD COMFORT CORNELIUS, OF CHICAGO, ILLINOIS.

STOPPER FOR FIXED WASHBOWLS.

SPECIFICATION forming part of Letters Patent No. 615,431, dated December 6, 1898.

Application filed December 13, 1897. Serial No. 661,596. (No model.)

*To all whom it may concern:*

Be it known that I, HAROLD COMFORT CORNELIUS, a citizen of the United States, residing at Chicago, in the county of Cook and State of Illinois, have invented a new and useful Improvement in Stoppers for Fixed Washbowls, of which the following is a specification.

The object of my invention is to produce a cheap and efficient stopper and one that will have the least number of parts possible; and the invention consists in the construction set forth in the claim.

Reference will be had to the accompanying drawings, in which—

Figure 1:
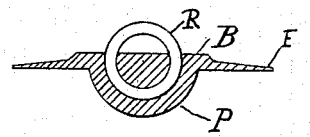
Figure 2:
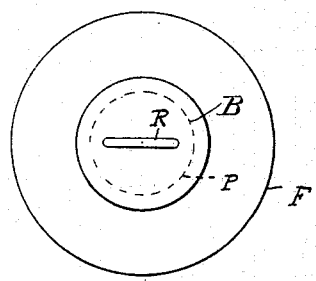
Figure 3:

Figure 1 is a side sectional view of the stopper. Fig. 2 is a top view. Fig. 3 is a view of a modified form of a ring that may be used.

The usual method of making a stopper has been to make a plug that fitted closely the hole in the washbowl; but I prefer to make a stopper out of a single piece of rubber having the large sharp-edged flange F and a hemispherical central projection P and a raised circular flat boss B, and into the body of the rubber I set edgewise the ring R, which is set down a considerable distance into the rubber. The under side of the flange F is made straight in order to always bring the outer sharp edge of the flange F in contact with the bowl, since the bottom of the bowl is generally curved concave. The projection P fits into the hole in the bowl loosely, and then the flange F yields to conform to the general surface of the bowl around the periphery of the hole and make a seal by reason of the pressure of the water above. I fasten the chain to ring R.

The ring R may be made solid and molded and vulcanized into the rubber, or it may be made in the form shown by Fig. 3 and the rubber be made with a hole to receive the ring, and then the ring may be sprung into the rubber and then bent to the finished form. These forms and methods of making the rubber and ring are far superior to and cheaper than any form yet used.

What I claim, and desire to secure by Letters Patent, is—

A stopper of the class described, made of a single piece of rubber, having the hemispherical projection P and the flat boss B, the sharp-edged flange F straight on its under side and a ring set solidly and vertically within the body of the rubber, and having its edge protruding from the rubber to which the chain may be fastened, substantially as shown and described.

In witness whereof I have hereunto signed my name, on this 10th day of December, 1897, in the presence of two witnesses.

HAROLD COMFORT CORNELIUS.

Witnesses:
M. A. VOGEL,
WM. R. CORNELIUS.